MEANS FOR LOCKING A SLIDER IN A CHANNEL

Filed Aug. 26, 1968

INVENTOR.
HENRY SMITH
BY
Ernest L. Brown
ATTORNEY

United States Patent Office 3,529,699
Patented Sept. 22, 1970

3,529,699

MEANS FOR LOCKING A SLIDER IN A CHANNEL

Henry Smith, 23394 Schoolcraft St.,
Canoga Park, Calif. 91304

Filed Aug. 26, 1968, Ser. No. 755,327
Int. Cl. B65h 59/10; G01b 3/20
U.S. Cl. 188—67 22 Claims

ABSTRACT OF THE DISCLOSURE

A means for locking a slider in position in a channel, particularly adapted to lock the slider of a universal variable gauge block in position in its channel. A plurality of gripping balls are wedged into a groove in the side of the channel, the balls being forced by a unique linkage from a finger-actuated push rod.

BACKGROUND OF THE INVENTION

The invention pertains to a means for locking the slider of a universal gauge block in position in a positive manner without influencing the position of the slider.

Universal gauge blocks, such as that shown on pages 174–177 of "Catalog 27," third edition, published in 1961 by the L. S. Starrett Company of Athol, Mass., are used for scribing lines in layout work, setting of machine tools and inspection gauges, and the like. The universal gauge block has a base block which is triangular shaped and has a slide upon the hypotenuse side thereof to receive a slider. The slider slides on the hypotenuse side of the base block; it has measuring surfaces which are parallel to the precision measuring surfaces upon the non-hypotenuse sides of the base block. One of the more serious problems with prior universal gauge blocks is that the lock for the slider influences the placement of the slider. That is, when the position of the slider is set, the lock tends to move the slider.

SUMMARY OF THE INVENTION

In the gauge block contemplated by this invention, the slider is locked in position by a lock which does not influence the positioning of the slider and which can be locked with the pressure of a finger.

The slider slides in a channel upon the hypotenuse surface of a universal precision gauge. The shape of the channel is usually rectangular. In the side walls of the channel are grooves into which substantially spherical gripping ball members, carried by the slider, may be wedged to lock the slider in place. In a preferred embodiment, there are eight gripping ball members, four engaging each of the grooves at the same time. After engagement of the balls with the grooves, the slider may subsequently be released to slide freely again until the balls are re-engaged with the grooves.

To force the gripping balls to engage the grooves in the side of the channel, force is transmitted upon the slider from a finger-actuated push rod to the gripping balls by a series of cammed surfaces. The cammed surfaces re-direct the force applied to the push rod. Briefly, in a preferred embodiment, the cammed surfaces comprise at least one column of forcing balls transmitting force from conical surfaces on the push rod to the curved surfaces of the gripping balls, forcing the gripping balls toward the channel grooves.

It is another feature of this invention that scales of the distances between measuring surfaces upon the slider to the measuring surfaces upon the sides of the base block are scribed along the hypotenuse side of the base block so that the distances may be read directly while positioning the slider. In this fashion, the position of the slider need not be compared to another gauge to find the distance between the measuring surfaces of the slider and the corresponding parallel measuring surfaces of the base block.

It is therefore an object of this invention to lock a movable member in position in a channel.

It is a more specific object of this invention to position a slider accurately upon the base block of a universal precision gauge.

It is another object of this invention to lock the slider of a universal gauge in position.

It is still a more specific object of this invention to provide a lock for a slider of a universal gauge, which lock is rapidly engaged and disengaged without influencing the slider position.

It is also a more specific object of this invention to provide a positive lock for a slider.

It is another object of this invention to provide scales along the slide of a universal gauge, showing the precise distances between predetermined surfaces upon the slider and selected surfaces upon the base block.

Although the lock of this invention is particularly adapted for use with a universal gauge block slider, it is also an object of this invention to provide a lock for engaging a slider in a track.

Other objects and advantages of this invention will become apparent from the following description, taken in connection with the accompanying drawings.

DESCRIPTION OF THE PREFERRED EMBODIMENT

Figure 1:
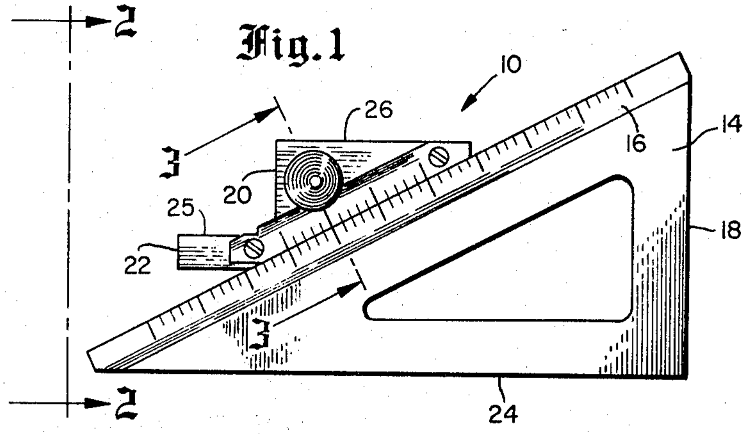
FIG. 1 is a side view of the universal gauge having the lock and calibrations of this invention.
Figure 2:
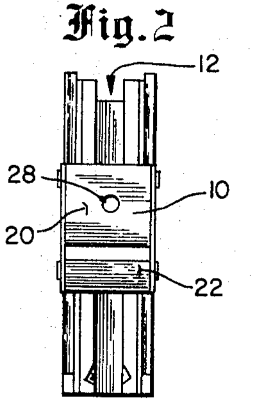
FIG. 2 is a view, taken from 2–2 in FIG. 1.

In the figures, a slider 10 is positioned to slide in a channel 12 along the hypotenuse side of a triangular base block 14 of a universal precision gauge. A scale 16 is calibrated to show the distance between surface 18, on the base block 14, and surfaces 20 and 22 upon the slider 10. Alternatively the scale 16 may be calibrated to show the distance between surface 24, upon the base block 14, and surfaces 25 and 26 upon the slider 10. Two or more scales may be used and they may be placed on opposite sides of the slider channel 12 as shown at 30, 32, 34, 36 in FIGS. 3 and 4. Further, extension posts (not shown) and offset gauges (not shown) may be fastened to the various surfaces, e.g. by screwing into a hole, such as hole 28, in the surface 20.

Figure 3:
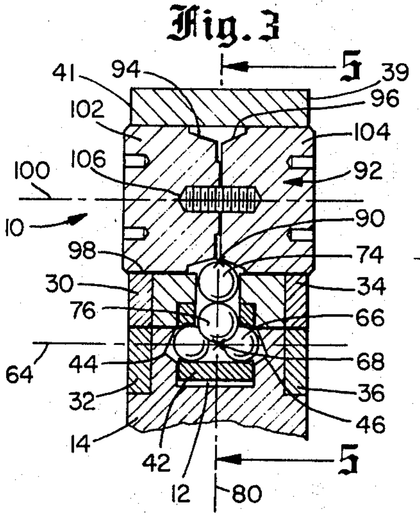
FIG. 3 is a view, partly in section, taken at 3–3 in FIG. 1, showing the lock in its unlocked position.
Figure 5:
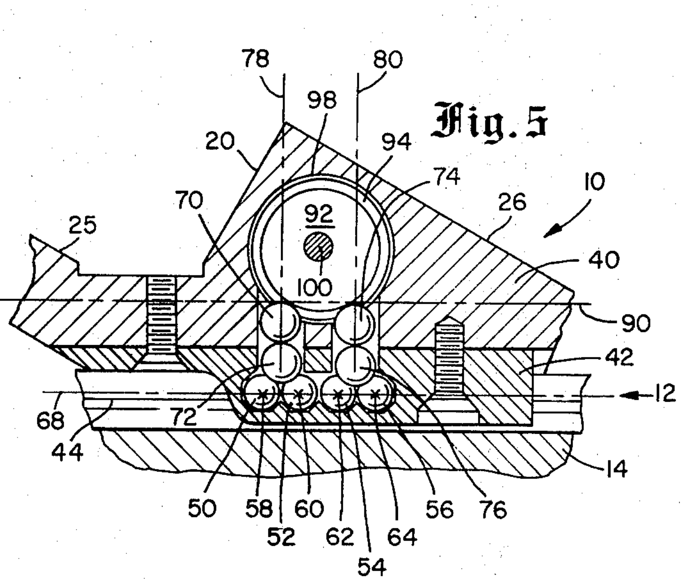
FIG. 5 is a view, partly in section, taken at 5–5 in FIG. 3.
Figure 4:
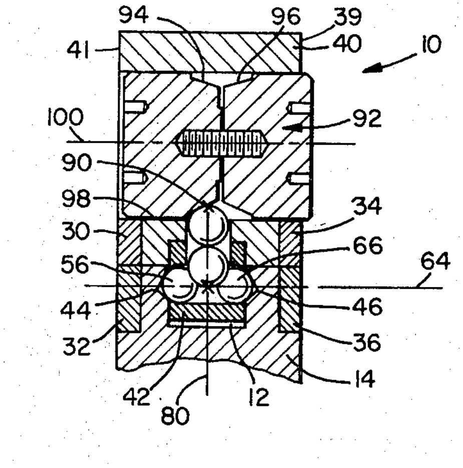
FIG. 4 is a view, partly in section, taken at 3–3 in FIG. 1, showing the lock in its locked position.

The slider 10 has a body 40 and guide 42 which slides freely in channel 12, as shown in FIGS. 3 through 5. The guide 42 may be screwed onto the body 40 of the slider 10, as shown particularly in FIG. 5.

In the side walls of the channel 12 are a pair of V-grooves 44, 46 into which a plurality of gripping balls 50, 52, 54, 56 may be wedged to lock the slider 10 in position.

In the preferred embodiment of the invention, four gripping balls are allowed to engage groove 44, and four other gripping balls are allowed to engage groove 46 at the same time to lock the slider 10 in place in the channel or slide 12. Each of the four gripping balls 50, 52, 54, and 56 on one side of the slider is aligned with one of four gripping balls on the other side of the slider 10. (Only one of the four gripping balls, ball 66, on the other side of the slider 10, is shown in FIGS. 3 and 4.) Thus four substantially coplanar axes 58, 60, 62, and 64 are defined perpendicular to the V-grooves 44, 46. Along each of the axes are positioned two gripping balls, each caged to move substantially only along its particular axis, with the two balls on each axis adapted to move in opposite directions into engagement with their adjacent grooves. In FIGS. 3 and 4, balls 56 and 66 are caged and positioned to move in opposite directions along axis 64 into and out of engagement with grooves 44 and 46, respectively. Balls 56 and 66 are shown in FIG. 3 out of engagement with grooves 44 and 46. In FIG. 4 they are shown engaging the grooves.

It is convenient to define a fifth axis 68 coplanar with and perpendicular to axes 58, 60, 62, and 64, positioned symmetrically between the two balls upon each of axes 58, 60, 62, and 64, as shown particularly in FIGS. 3 and 4.

Forcing means, such as forcing balls 70, 72, 74, and 76 are positioned and caged to apply force along sixth and seventh axes 78 and 80 which are perpendicular to axis 68 and to the plane of axes 58, 60, 62, 64, and 68. Axis 78 is positioned midway between axes 58 and 60; axis 80 is positioned midway between axes 62 and 64. Thus, downward force applied to the column of balls 70, 72 is applied to a cluster of four gripping balls which are positioned upon axes 58, 60, i.e. to balls 50, 52 and two other balls (not shown) in the other two quadrants. Downward force applied to the column of balls 74, 76 is applied to a cluster of four gripping balls which are positioned upon axes 62, 64, i.e. balls 54, 56, 66 and one other ball (not shown) in the remaining quadrant. Note that the gripping balls are symmetrically clustered in four quadrants about the axes 78 and 80. Each of the forcing balls 72 and 76 engages all four of its associated gripping balls at the same time, forcing them apart by the camming action of the curvature of the contacting balls. However, because the gripping balls are caged, they transmit force only in the direction of axes 58, 60, 62, and 64 to wedge the gripping balls into engagement with grooves 44, 46.

An eighth axis 90 is conveniently defined, parallel to axis 68, coplanar with axes 68, 78, and 80, and displaced from axis 68 away from the slide or channel 12.

A push rod 92, having conical cams 94, 96 in the central portion thereof, is positioned in bearings 98 upon the slider 10. The push rod 92 is adapted to slide along a ninth axis 100 which is parallel to axes 58, 60, 62, and 64, which is positioned midway between axes 78 and 80, and which is positioned so that axis 90 is between axis 100 and the plane of axes 58, 60, 62, and 64.

The forcing balls 70, 74 contact the cammed surfaces 94, 96 of the push rod 92 substantially at points upon the axis 90, moving but slightly therefrom as force is applied.

The push rod 92 preferably is made in two pieces 102 and 104 which are screwed together by a fully threaded screw 106. Spanner wrench sockets may be placed on the ends of the push rod 92 so that the two parts 102 and 104 may be screwed together. In a preferred embodiment, the ends of the push rod 92 are concave (not shown) to fit an operator's finger.

The two pieces 102, 104 may be shortened so that they at no time extend beyond the surfaces 39 and 41 of the body 40 of the slider 10. The body 40, then, guards against inadvertent operation of the push rod 92. For example, when the gauge is lying upon its side, the push rod 92 would not project beyond surfaces 39 and 41 and, hence, would be undisturbed.

In operation, the operator moves the slider 10 to a desired position, in the channel 12, which may be read off of the scales 30, 32, 34, 36. He then pushes either end of the push rod 92.

When the push rod 92 is pushed, either cam surface 94 or 96 engages balls 70, 74 which transmit force along axes 78, 80 to balls 72, 76. Balls 72, 76 push the gripping balls 50, 52, 54, 56, 66 and three other gripping balls (not shown) along axes 78 and 80. The curvature of the balls redirects the forces against the gripping balls along the axes 58, 60, 62, and 64 thus causing the gripping balls to engage the V-grooves 44, 46 in an interference fit, locking the slider 10 in position.

To disengage the lock, the push rod 92 is moved from the locked position of FIG. 4 to the neutral position of FIG. 3, removing forces from all of the balls, allowing the slider 10 to move freely in the channel 12.

Thus the novel lock of this invention is particularly adapted to hold a movable part, such as slider 10, in position in a track, such as channel 12, having cammed surfaces, such as V-grooves 44, 46 in the side walls of channel 12. Although it is particularly adapted for the use described it may also be used in other devices where the same characteristic is desired.

It is, therefore, not intended that the invention be limited to use in the universal precision gauge described, but only in accordance with the following claims in which, I claim:

1. In combination:
means forming a channel having cammed surfaces in at least one side of said channel;
means forming a movable member, adapted and positioned to move in said channel;
locking means, carried by said movable member, having freedom to engage said cammed surfaces in an interference fit and to disengage said cammed surfaces; and
means, carried by said movable member, for selectively forcing said locking means into engagement with said cammed surfaces to lock said movable member in position in said channel, and disengaging said cammed surfaces to allow said movable member to move freely in both directions in said channel.

2. Apparatus as recited in claim 1 in which said means forming a channel is a base block of a precision gauge, having measuring surfaces thereon, with said channel formed on the hypotenuse side thereof; and in which said means forming a movable member is a slider of a precision gauge, having measuring surfaces thereon.

3. Apparatus according to claim 1 in which:
said cammed surfaces form at least one groove in at least one side of said channel;
said locking means are rounded members adapted to be wedged into said grooves; and
said means for forcing said rounded members into engagement with said grooves is another rounded member which transmits force from a direction perpendicular to said channel onto said rounded members to force said first mentioned rounded members toward at least one wall of said channel into said grooves.

4. Apparatus according to claim 3 in which: said first-named rounded members are substantially spherical gripping balls, each caged to allow movement thereof only toward and away from said grooves.

5. Apparatus according to claim 4 in which: said means for forcing said balls into engagement with said grooves is at least one forcing ball, caged to allow movement of said forcing balls only perpendicular to said channel and to the axes of motion of said gripping balls, contacting said gripping balls and using the surfaces of said balls as cams to re-direct forces from said forcing balls onto said gripping balls to force said gripping balls toward at least one wall of said channel.

6. Apparatus as recited in claim 5 in which said forcing balls are forced by a cam in said movable member.

7. In combination:
means forming a channel having at least one grooved cammed surface in at least one side of said channel;
means forming a movable member, adapted and positioned to move in said channel;
a plurality of spherical gripping balls, carried by said movable member, each caged to allow movement thereof only toward and away from said grooves, adapted to be wedged into and disengaged from said grooves;

at least one forcing ball, caged to allow movement thereof only perpendicular to said channel and to the axes of motion of said gripping balls, contacting said gripping balls and using the surfaces of said balls as cams to re-direct forces from said forcing balls onto said gripping balls to force said gripping balls toward at least one wall of said channel; and a push rod having substantially conically shaped cam surfaces positioned against at least a portion of said forcing balls to apply force upon said forcing balls when said push rod has force applied along its axis.

8. Apparatus as recited in claim 7 in which said grooves are V-grooves positioned upon both walls of said channel.

9. Apparatus as recited in claim 8 in which forces applied to said forcing balls are each re-directed against at least two gripping balls, forcing said gripping balls apart in opposite directions to wedge them into engagement with both of said grooves.

10. Apparatus as recited in claim 9 in which said push rod comprises: two members, each having conically shaped surfaces upon one end thereof, attached together at their smaller, conically shaped, end, and adapted to slide in a bearing within said movable member.

11. Apparatus as recited in claim 10 in which said push rod has finger receptacles in the end thereof.

12. Apparatus as recited in claim 10 in which said channel is formed in the hypotenuse side of a triangular shaped base block of a precision gauge, having measuring surfaces thereon; and in which said movable member is a slider of a precision gauge, having measuring surfaces thereon.

13. In combination:

means forming a channel having at least one groove in at least one side thereof;

a movable member, adapted and conformed to move in said channel;

a first set of substantially parallel axes, having a plurality of axes defined upon said movable member, perpendicular to said grooves and substantially in a plane aligned with said grooves when said movable member is positioned in said channel;

a plurality of gripping balls, positioned two upon each of the axes of said first set of axes and constrained to move substantially only along the axes of said first set of axes;

a first axis defined upon said movable member, perpendicular and coplanar with the axes of said first set of axes, and substantially equally spaced from the sides of said channel when said movable member is positioned in said channel;

a second set of axes, having at least one axis, defined upon said movable member, perpendicular to said plane and to said first axis, each spaced substantially midway between a pair of adjacent axes of said first set of axes; and at least one forcing means, each positioned and constrained to move substantially only along one of the axes of said second set of axes, and positioned to force said gripping balls outward in opposite directions along the axes of said first set of axes into engagement with said grooves.

14. Apparatus as recited in claim 13 in which:

said channel is formed in the hypotenuse side of a triangular shaped base block of a precision gauge, having measuring surfaces thereon; and said movable member is a slider of a precision gauge, having measuring surfaces thereon.

15. Apparatus as recited in claim 13 and further comprising:

a second axis, defined upon said movable member, perpendicular to the plane of said first axis and said second set of axes, and positioned away from the plane of said first set of axes in the direction toward the source of force applied to said forcing means; and camming means, adapted to slide in a bearing in said movable member along said second axis, its cammed surface contacting said forcing means to apply force to and remove force from said forcing means in accordance with the position of said camming means.

16. Apparatus as recited in claim 15 in which: said forcing means comprises at least one forcing ball, at least one ball of each of said forcing means contacting the camming surfaces of said camming means.

17. In combination:

means forming a channel having at least one groove in at least one side thereof;

a movable member, adapted and conformed to move in said channel;

a first set of substantially parallel axes, having a plurality of axes defined upon said movable member, perpendicular to said grooves and substantially in a plane aligned with said grooves when said movable member is positioned in said channel;

a plurality of gripping balls, positioned two upon each of the axes of said first set of axes ond constrained to move substantially only along the axes of said first set of axes;

a first axis defined upon said movable member, perpendicular and coplanar with the axes of said first set of axes, and substantially equally spaced from the sides of said channel when said movable member is positioned in said channel;

a second set of axes, having at least one axis, defined upon said movable member, perpendicular to said plane and to said first axis, each spaced substantially midway between a pair of adjacent axes of said first set of axes;

at least one forcing means, each comprising one forcing ball, and each positioned and constrained to move substantially only along one of the axes of said second set of axes, and positioned to force said gripping balls outward in opposite directions along the axes of said first set of axes into engagement with said grooves;

a second axis, defined upon said movable member, perpendicular to the plane of said first axis and said second set of axes, and positioned away from the plane of said first set of axes in the direction toward the source of force applied to said forcing means;

a push rod member having conically shaped camming surfaces narrowing toward the center of said push rod member, said push rod member being adapted to slide in a bearing in said movable member along said second axis, at least one ball of each of said forcing means contacting the camming surfaces of said push rod member to apply force to and remove force from said forcing means in accordance with the position of said push rod member.

18. Apparatus as recited in claim 17 in which:

said channel is formed in the hypotenuse side of a triangular shaped base block of a precision gauge, having measuring surfaces thereon; and said movable member is a slider of a precision gauge, having measuring surfaces thereon.

19. Apparatus as recited in claim 18 in which: said slider and the hypotenuse side of said base block each have at least one scale thereon, the register of said scales measuring the position of at least one of said measuring surfaces upon said slider relative to at least one of said measuring surfaces upon said base block.

20. Apparatus as recited in claim 17 in which the line of contact between said camming surfaces and said forcing balls is along a third axis which is parellel to said first axis, in the plane of said first axis and of said second set of axes, and positioned between said second axis and said first axis.

21. Apparatus as recited in claim 20 in which:
said first set of axes has four axes;
said second set of axes has two axes; and
said forcing balls of each of said forcing means contacts four of said gripping balls, substantially symmetrically, to force one of said gripping balls on each of said four axes of said first set of axes into engagement with one of said grooves, and to force the other of said gripping balls on each of said four axes of said first set of axes into engagement with the other of said grooves.

22. Apparatus as recited in claim 21 in which:
said channel is formed in the hypotenuse side of a triangular shaped base block of a precision gauge, having measuring surfaces thereon; and
said movable member is a slider of a precision gauge, having measuring surfaces thereon.

References Cited

UNITED STATES PATENTS

| | | | |
|---|---|---|---|
| 2,319,231 | 5/1943 | Hawley | 188—73 |
| 2,462,284 | 2/1949 | Rauch. | |
| 3,057,223 | 10/1962 | Korsgren | 74—531 X |
| 3,092,227 | 7/1963 | Dossier | 188—67 X |
| 3,164,030 | 1/1965 | Fodrea et al. | 74—531 X |

GEORGE E. A. HALVOSA, Primary Examiner

U.S. Cl. X.R.

33—162; 74—531; 188—40